T. CARROLL.
CASH REGISTER.
APPLICATION FILED JUNE 26, 1916.
1,265,301.
Patented May 7, 1918.
7 SHEETS—SHEET 1.
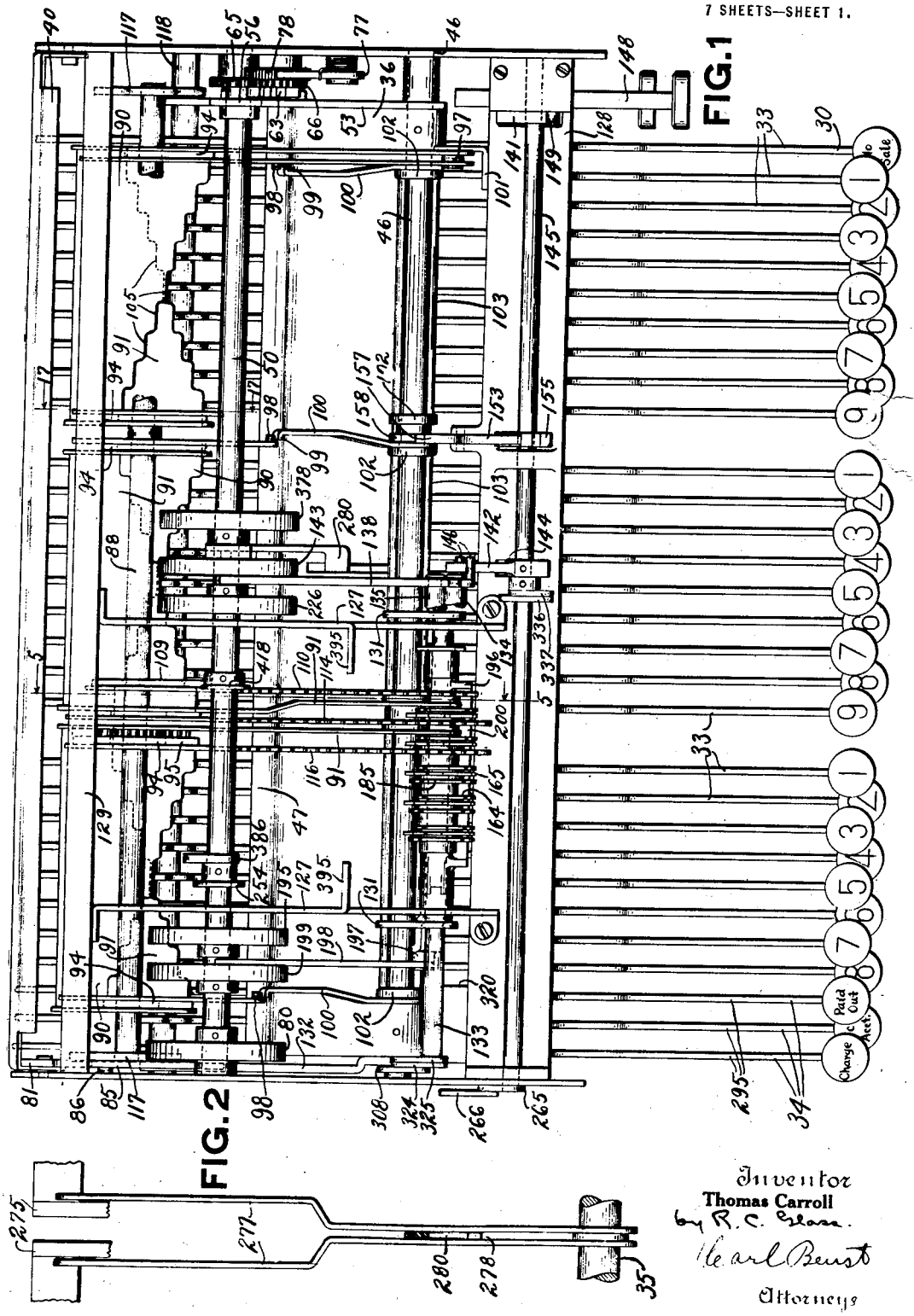
Inventor
Thomas Carroll
by R. C. Glass.
Carl Beust
Attorneys

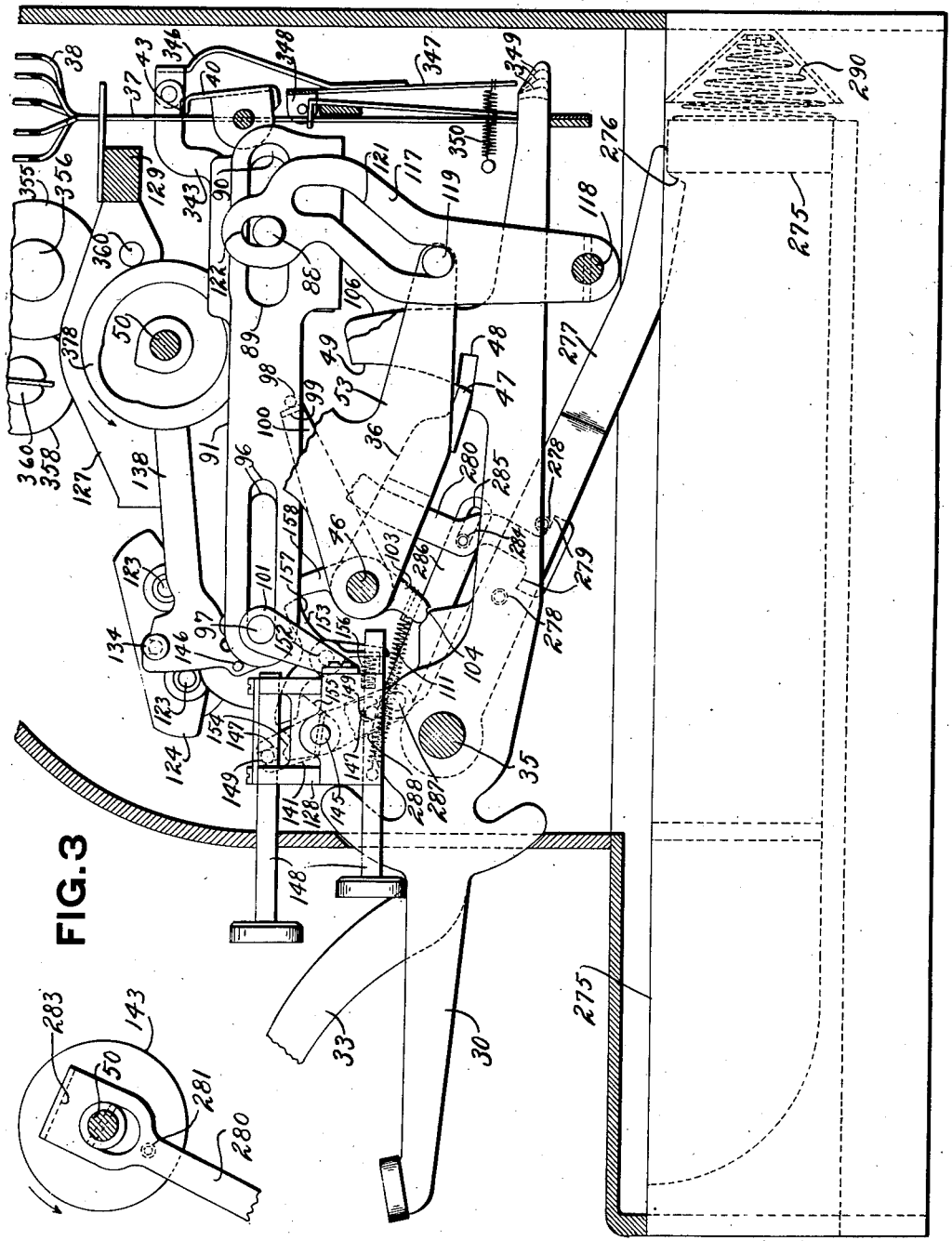

T. CARROLL.
CASH REGISTER.
APPLICATION FILED JUNE 26, 1916.
1,265,301. Patented May 7, 1918.
7 SHEETS—SHEET 4.
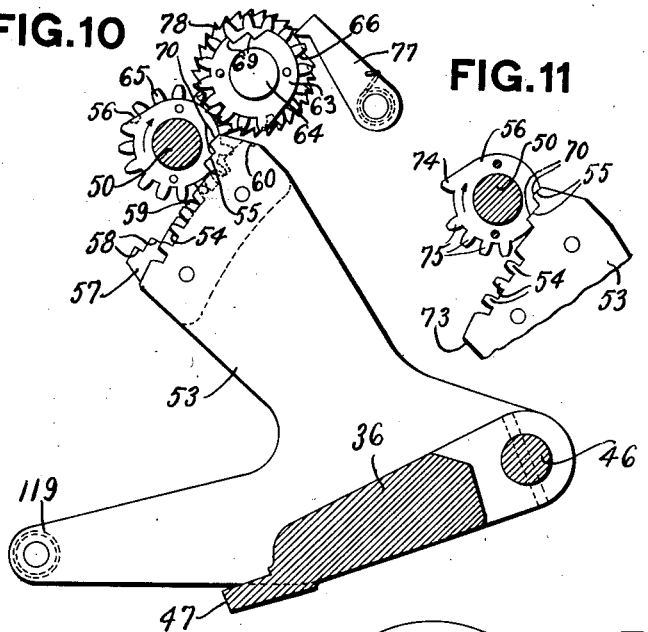
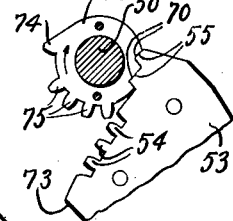
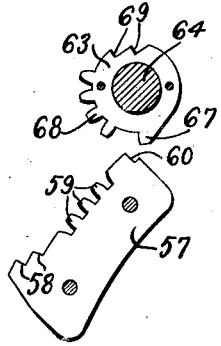
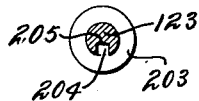
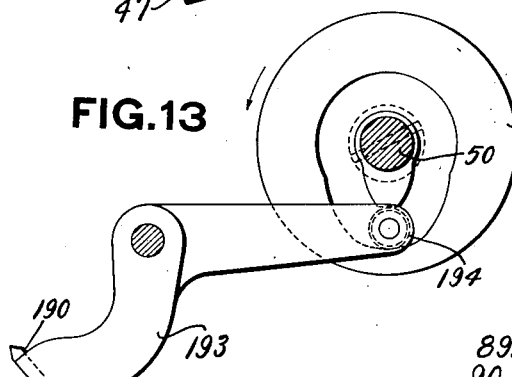
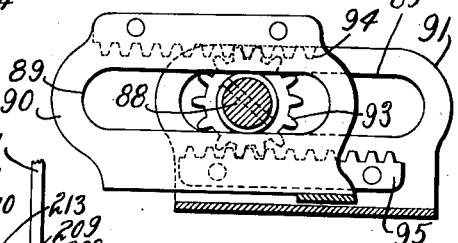
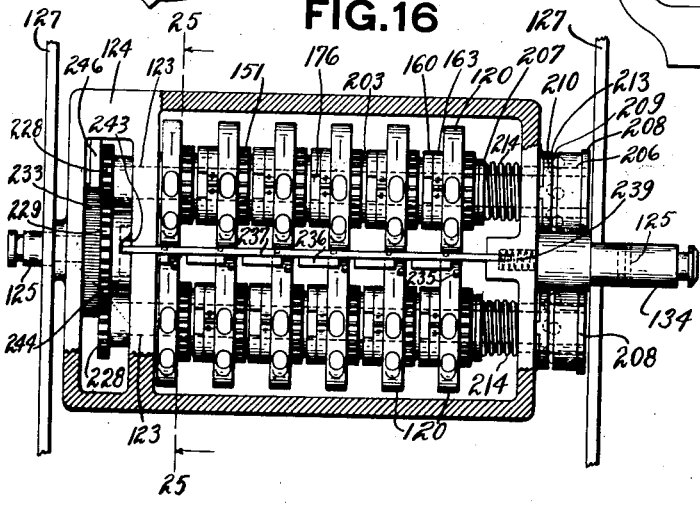
Inventor
Thomas Carroll
by R.C. Glenn
Earl Beust
Attorneys

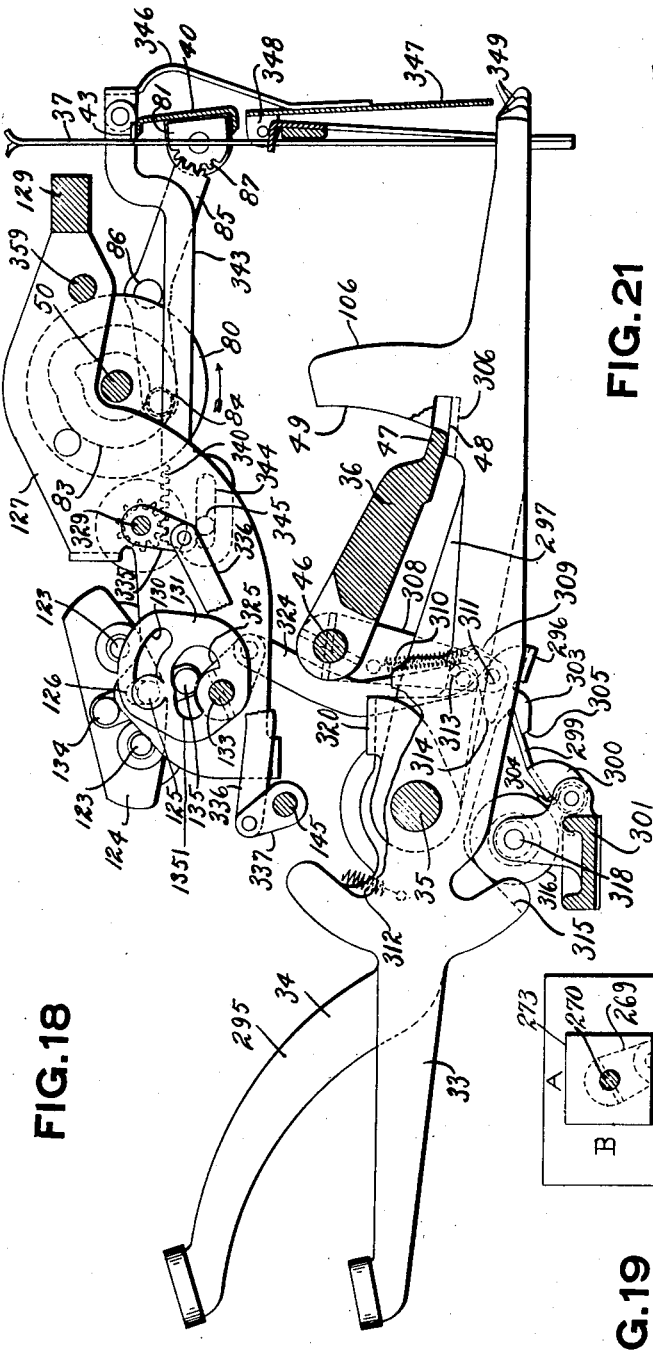
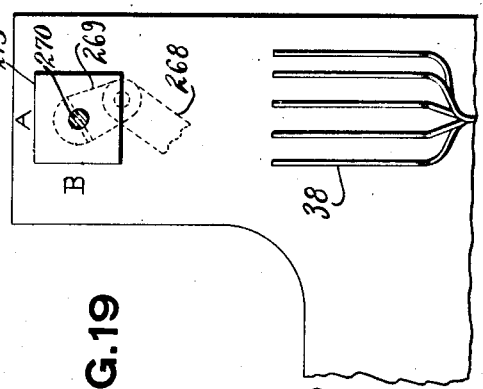
T. CARROLL.
CASH REGISTER.
APPLICATION FILED JUNE 26, 1916.
1,265,301.
Patented May 7, 1918.
7 SHEETS—SHEET 5.
FIG. 18
FIG. 19
FIG. 20
FIG. 21
Inventor
Thomas Carroll
by R. C. Glass.
Carl Beust
Attorney

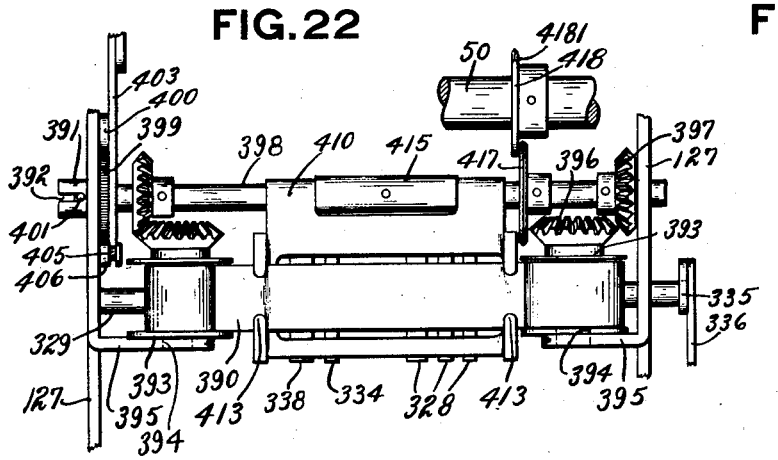
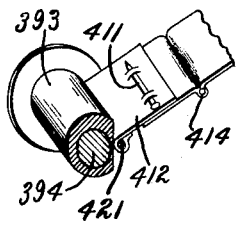
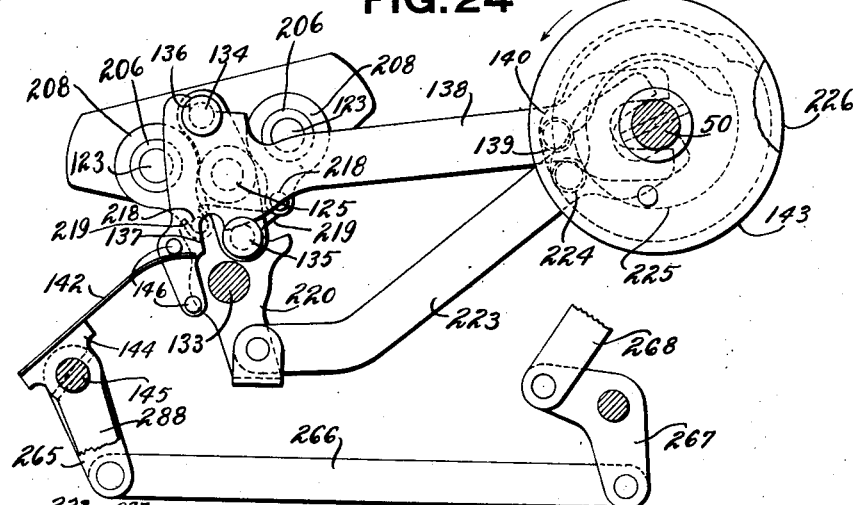

T. CARROLL.
CASH REGISTER.
APPLICATION FILED JUNE 26, 1916.

1,265,301.

Patented May 7, 1918.
7 SHEETS—SHEET 7.

Inventor
Thomas Carroll
by R. C. Glass
Earl Benst
Attorneys

UNITED STATES PATENT OFFICE.

THOMAS CARROLL, OF DAYTON, OHIO, ASSIGNOR TO THE NATIONAL CASH REGISTER COMPANY, OF DAYTON, OHIO.

CASH-REGISTER.

1,265,301.

Specification of Letters Patent.  Patented May 7, 1918.

Application filed June 26, 1916. Serial No. 106,034.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to key operated cash registers and the like and the principal object of the invention is to provide an improved differential mechanism which is positive in operation and eliminates the possibility of overthrow of accounting elements.

Another object of the invention is to provide improved means for preventing movement of the denominational elements of the totalizing mechanism while the elements are not being actuated by the actuating mechanism, this improved means also being employed for turning the elements to zero.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 1 is a detail top plan view of the machine embodying the present invention with the cabinet, indicators and totalizing and printing mechanisms removed.

Fig. 2 is a detail top plan view of the arms for locking the clerks' drawers within the machine and shows fragments of the drawers.

Fig. 3 is a transverse vertical section through the machine, the section being taken just within the right hand side frame of the machine.

Fig. 4 is a detail partial view of the means for operating the arms locking the clerks' drawers within the machine.

Figs. 10, 11 and 12 are detail views of the means for rotating the main rotation shaft of the machine.

Fig. 13 is a detail side view of the device for alining the transfer mechanism in its normal and moved positions.

Fig. 14 is a detail sectional view through one of the totalizer shafts and shows one of the frictional retaining disks mounted on the shaft.

Fig. 15 is a detail perspective view of the device for arresting the totalizer wheels in zero position when the latter are turned to zero.

Fig. 16 is a detail top plan view of the totalizers with the supporting frame shown partly broken away.

Fig. 17 is a detail sectional view through the complementary stepped frames actuated by the units bank of keys, the section being taken on the line 17—17 of Fig. 1.

Fig. 18 is a detail sectional view taken immediately to the right of the totalizing mechanism, and looking toward the left. In this view the printing mechanism is omitted and but one of the amount keys is shown.

Fig. 19 is a detail side view of the clerk's indicator and the upper portions of the amount indicators.

Fig. 20 is a detail front view of the device for preventing operation of more than one transaction key at a time.

Fig. 21 is a fragmentary detail side view of one of the transaction keys and the yoke and connections operated thereby.

Fig. 22 is a detail top plan view of the ribbon feeding means.

Fig. 23 is a detail perspective of one of the ink ribbon spools or rolls and shows the manner in which the ribbon is connected to the spools.

Fig. 24 is a detail side view of the totalizing mechanism.

Fig. 25 is a detail vertical section taken on the line 25—25 of Fig. 16.

Figure 5:
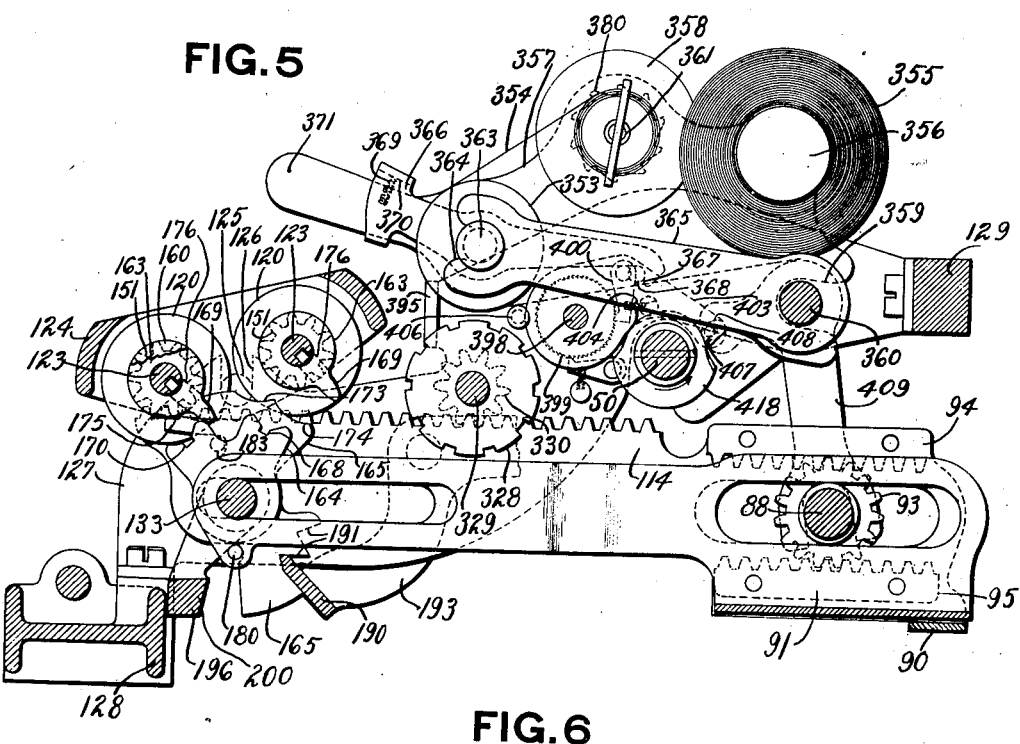
Fig. 5 is a transverse vertical detail taken through the totalizers and the actuating mechanism therefor and shows the printing mechanism in full. The section through the actuating mechanism is taken on the line 5—5 of Fig. 1.

Briefly stated, the invention relates to key operated cash registers having initial keys and transaction keys together with amount keys grouped in denominational banks. The amount keys are adapted to raise indicator tablets to view and control the differential mechanism for operating the selected clerk's totalizer and the printing mechanism. The totalizers are selected for operation under the control of the clerks' keys.

The differential mechanism employed in the present invention comprises a plurality of pairs of frames differentially movable with respect to each other and so constructed that the total of the movement of each pair is constant. There is one pair of frames for each bank of amount keys and the keys control the relative movement between the frames so that movement of one of the frames may actuate to the desired extent a corresponding element of the selected clerk's totalizer. The frames of each pair are driven in the same direction by pinions located between and in engagement with racks carried by the frames. The pinions are mounted on a shaft which is moved bodily to an invariable extent through a key coupler operated by the amount keys. The frames are provided with steps which engage the operated amount keys positively to limit the movement of the frames.

The transaction keys are constructed in two parts so that when the forward part is manually depressed the rear part is moved into position to be operated by the key coupler. Means are provided for latching the forward and rear parts of the transaction keys in operated position after the forward part has been manually operated. The operation of a transaction key through suitable connections prevents operation of the totalizers.

Keyboard.

The "no sale" key 30 (Figs. 1 and 3), the amount keys 33 (Figs. 1 and 18) and the transaction keys 34 (Figs. 1, 18 and 21) are pivoted on a transverse rod 35 supported in the side frames of the machine. The amount keys and the "no sale" key extend rearwardly of the rod 35 and beneath a key coupler 36 and support rods 37 of indicator tablets 38 (Figs. 3 and 19). Thus depression of the amount keys or the "no sale" key serves to lift the desired indicator tablets to view as is well known in the art, the tablets being latched in their elevated positions by a retaining frame or bar 40 (Fig. 3) engaging under shoulders 43 on the supporting rods 37.

The key coupler 36 is rigidly mounted on a shaft 46 (Figs. 1, 3 and 18) journaled in the side frames of the machine. The key coupler is provided with the rearwardly extending edge or shoulder 47 coacting with notches 48 in the amount and "no sale" keys and curved surfaces 49 of these keys to compel simultaneous and uniform depression of the latter as is well understood in the art.

A shaft 50 (Figs. 1, 10, 11 and 12) is the main cam shaft of the machine and is journaled in the side frames of the latter. The means for rotating this shaft will now be described. Fast on the right hand end of the key coupler 36 is an arm 53 (Figs. 10 and 11) having three teeth 54 and two shoulders or steps 55 for coöperating with a mutilated pinion 56 fast on the shaft 50. Fast on the arm 53 is a rack 57 (Figs. 10 and 12) having two shoulders 58, three teeth 59 and a shoulder 60 for coöperating with a mutilated pinion 63 loose on a stud 64. A pinion 65 (Fig. 10) fast on the shaft 50 meshes with a pinion 66 fast to the mutilated pinion 63. When the key coupler 36 is rocked clockwise (Fig. 10) by the depression of an amount or the "no sale" key the shoulder 60 (Fig. 12) on the rack 57 first engages a tooth 67 on the pinion 63 thereby turning the latter counter-clockwise to mesh its teeth 68 with the teeth 59 on the rack 57. Near the end of this clockwise movement of the key coupler 36 and as the teeth 68 pass out of engagement with the teeth 59 the shoulders 58 coöperate with notches 69 in the pinion 63 to complete the first one-half rotation of the pinion. During this one-half movement of the pinion 63 the shaft 50 (Fig. 10) is given one-half of a rotation in the direction of the arrow through the pinions 65 and 66. During the initial clockwise movement (Fig. 10) of the key coupler 36 the shoulders 55 on the arm 53 pass out of engagement with notches 70 in the pinion 56 to permit rotation of the shaft 50. Near the beginning of the counter-clockwise movement (Fig. 10) of the key coupler 36, to normal position, the shoulders 58 (Fig. 12) first move out of engagement with the notches 69 and then an edge 73 (Fig. 11) on the arm 53 engages a tooth 74 on the pinion 56 thereby rotating the pinion 56 to move its teeth 75 into mesh with the teeth 54. As the teeth 75 pass out of engagement with the teeth 54 the shoulders 55 engage in the notches 70 thereby completing the second one-half rotation of the pinion 56 and shaft 50. It can be seen from the above description that when the key coupler 36 is rocked clockwise (Fig. 10) the rack 57 coöperates with the pinion 63 to give the shaft 50 one-half of a rotation in the direction of the arrows shown in Figs. 10 and 11. Then during the return movement of the key coupler 36 to normal position the edge 73, teeth 54 and shoulders 55 on which arm 53 coöperates with the pinion 56 impart a second one-half rotation to the shaft in the direction of the arrows, the shaft being given one complete rotation in this manner. A spring operated retaining pawl 77 (Fig. 10) engages a ratchet 78 fast to the pinion 66 and serves to prevent backward rotation of the shaft 50 and hence compels complete operation of a key after its operation is once started.

Fast on the shaft 50 is a disk 80 (Fig. 18) having a cam groove 83 into which projects a roller 84 mounted on the forward end of a lever 85. The lever 85 is pivoted at 86 and on its rear end has teeth coöperating with teeth 87 formed on a plate 81 fast on one side of the retaining bar 40. This cam groove 83 is so constructed that the retaining bar 40 is rocked through the lever 85 to release the indicator tablets, elevated during the preceding operation, and latch the indicator tablets elevated during the particular operation of the machine in elevated position as is well understood in the art.

*Differential mechanism.*

The differential mechanisms or devices controlled by the various banks of amount keys are similar in principle but have slightly different constructions. The units differential mechanism will therefore be described first and then the slight differences existing between the tens and hundreds differential mechanisms and the units differential mechanism will be pointed out.

Figure 6:
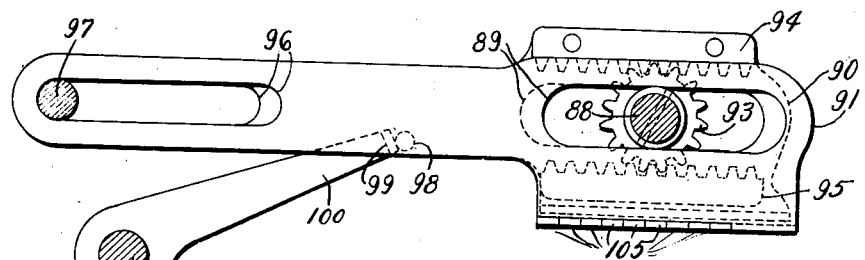
Fig. 6 is a detail right hand side view of the complementary stepped frames operated by the units bank of keys.

A shaft 88 (Figs. 1, 3, 6 and 17) projects through slots 89 formed in the vertical sides of frames 90 and 91. The frame 90 is positioned within the frame 91. Two pinions 93 (Figs. 6 and 17) mesh with racks 94 mounted on the vertical sides of the frame 90 and with racks 95 mounted on the sides of the frame 91. The forward portions of the right hand sides of the frames 90 and 91 are provided with slots 96 (Figs. 3 and 6) through which projects a pin 97, the pin serving to guide the frames 90 and 91 in their movements. The pin 97 is mounted on an arm or bracket 101. The right hand side of the frame 90 is provided with a pin 98 (Figs. 1, 3 and 6) normally engaging a flange or projection 99 on an arm 100 pivoted on the shaft 46 and fast to a frame 103 (Figs. 1 and 3) having ears 102 (Fig. 1) at each end by which it is pivoted on the shaft 46. The lower edge of this frame 103, which extends over all of the keys in the units bank, engages surfaces 104 (Fig. 3) on these keys so that when a key is depressed the frame 103 and arm 100 are rocked counter-clockwise (Fig. 3) against the action of a spring 111 to raise the projection 99 from in front of the pin 98. The shaft 88 is moved forwardly an invariable extent and then rearwardly to normal position at each operation, as will be described presently. The base or horizontal portion of each of the frames 90 and 91 (Fig. 1) is provided with nine steps or graduations 105 there being one step for each key. These steps on the two frames are complementarily arranged to each other so that when a key is depressed the sum of the extents of movements of the two frames will always equal nine units. When a key is depressed its edge 106 (Figs. 3 and 18) which is concentric with the shaft 35 moves into the path of movement of the corresponding steps 105 on the frames 90 and 91. During this movement of the key the shaft 88 (Figs. 6 and 17) is moved forwardly.

It can be seen from the above description that if no key in the units bank is depressed the frame 90 (Figs. 3, 6 and 7) is locked against forward movement by the engagement of the projection 99 with the pin 98. Then during forward movement of the shaft 88, the pinions 93 and shaft 88 are rotated clockwise by the movement of the pinions along the racks 94, thereby moving the frame 91 forwardly nine steps as the pinions 93 also mesh with the racks 95. The frame 91 is moved forwardly twice as fast as the shaft 88. If the 5¢ key is depressed the projection 99 is moved out of engagement with the pin 98 and the two frames 90 and 91 are moved forwardly five steps as a unit and are arrested by engagement of their middle or "five" steps 105 with the edge 106 of the 5¢ key. As there is no relative movement between these two frames it can be seen that the shaft 88 is not rotated. If a key of lesser value than five cents is depressed the two frames 90 and 91 move forwardly as a unit until the corresponding step 105 on the frame 90 engages the edge 106 of the operated key. Then the shaft 93 is rotated clockwise (Fig. 6) and the frame 91 moved forwardly until one of its steps engages the edge 106 of the operated key at which time the shaft 88 reaches the end of its forward movement. If a key of greater value than the 5¢ key is depressed the frames 90 and 91 are moved forwardly as a unit until the corresponding step on the frame 91 engages the edge 106 of the operated key to arrest the frame. Then during the continued forward movement of the shaft 88 the pinions 93 (Fig. 6) roll over the racks 95 thereby moving the frame 90 forwardly twice as fast as the shaft is moved. At the end of the forward movement of the shaft 88 one of the steps 105 of the frame 91 engages the edge 106 of the operated key. After movement of frame 91 has been arrested the shaft 88 is rotated counter-clockwise. It can now be seen from the above description that the steps 105 on the frames 90 and 91 are so positioned that the frame 90 moves forward an extent corresponding to the value of the depressed key while the frame 91 moves forward an extent complementary to such value and therefore the combined movement of both the frames is constant. For instance, the step on the frame 90 which coöperates with the 1¢ key is normally spaced from the 1¢ key so that when moved into engagement therewith the frame will be moved one step. The corresponding step 105 on the frame 91 is located a distance of eight steps or units from the 1¢ key and consequently this frame moves forwardly eight steps. If the 8¢ key is depressed the frames 91 and 90 are moved forwardly one and eight steps respectively. Accordingly the movement between the frames is always complementary the frames together always moving nine steps.

Figure 27:
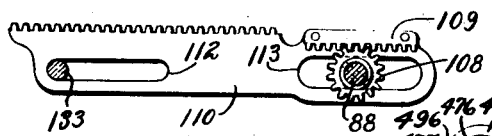
Fig. 27 is a detail side view of the units actuating rack.

A pinion 108 (Fig. 27) fast on the shaft 88 meshes with a rack plate 109 fast on a units actuating rack 110 (Figs. 1 and 27). The units actuating rack 110 is provided with two slots 113 and 112 through which shafts 88 and 133 respectively project to guide the rack in its movement. As the pinion 108 is fast on the shaft 88 it is obvious that the actuating rack 110 is moved forwardly the same distance as the frame 90, the distance being always commensurate to the key depressed in the units bank.

The frame 91 (Figs. 1 and 5) controlled by the tens bank of keys is positioned within the frame 90, the relative positions of these frames being reverse to that of the corresponding frames controlled by the units bank of keys. The pinions 93 (Fig. 5) which mesh with the racks 94 and 95 on the sides of the frames 90 and 91 controlled by the tens bank of keys are loosely mounted on the shaft 88. The left hand side of the frame 90 forms the tens actuating rack 114. The pin 98 (Fig. 1) on the frame 90 coöperates with the arm 100 which is moved out of engagement with the pin 98 in the same manner as the arm 100 for the units bank is moved out of engagement with the corresponding pin 98, there being one frame 103 for each bank of keys. It can be seen from this description that the frame 90 is moved to extents commensurate to the keys depressed in the tens bank while the frame 91 moves to complementary extents.

The frame 90 for the hundreds bank of keys (Fig. 1) is positioned within the frame 91 and the right hand side of the frame 90 forms a hundreds actuating rack 116. The pinions 93 which mesh with the racks 94 and 95 on the frames 90 and 91 appropriate to the hundreds bank of keys are loose on the shaft 88. The frame 90 is moved forwardly to extents commensurate to the keys depressed in the hundreds bank while the frame 91 moves to complementary extents.

The ends of the shaft 88 project through slots 122 formed in arms 117 (Figs. 1 and 3) fast on a shaft 118. Pins 119 on the arm 53 and an arm 132 (Fig. 1) fast on the left hand end of the key coupler 36 project through slots 121 (Fig. 3) in the arms 117. These slots 121 are so constructed that upon depression of a key its edge 106 is first raised into the path of movement of the corresponding steps 105 on the frames 90 and 91 and then the arms 117 are rocked counter-clockwise (Fig. 3) to move the shaft 88 forward an invariable extent. When the key and key coupler 36 are moved to normal position the arms 117 and shaft 88 and hence the frames 90 and 91 are restored to normal position.

*Totalizer.*

In the present invention two totalizers are employed and these totalizers are selected for operation under the control of corresponding clerks' keys.

Each totalizer comprises a plurality of registering wheels 120 (Figs. 5 and 16) loosely mounted on a corresponding shaft 123. The shafts 123 are journaled in a frame 124 having studs 125 (Figs. 5, 16 and 18) projecting through slots 126 formed in frames 127. The frames 127 (Figs. 1, 5 and 18) are mounted at their forward ends on a cross frame 128 and at their rear ends are fast on a cross rod 129. The studs 125 also project through slots 130 (Fig. 18) formed in arms 131 fast on the shaft 133 which is journaled in the frames 127. These slots 130 are eccentric to the shaft 133 and the pins 125 are normally in engagement with the forward ends thereof to retain the pins 125 in engagement with the lower ends of the slots 126.

On the right hand side of the totalizer frame are studs 134 and 135 (Fig. 24) adapted to engage in notches 136 and 137 respectively formed in a pitman 138. The stud 135 projects through a suitable slot (not shown) in the right hand frame 127 and into a slot 1351 formed in the right hand arm 131 (Fig. 18) to permit movement of the stud. The pitman 138 carries a roller 139 projecting into a cam groove 140 formed in a disk 143 fast on the shaft 50. If the pin 134 is in engagement with the notch 136 in the pitman 138 pinions 151 (Fig. 5) fast to the wheels 120 of the forward totalizer are normally in engagement with the actuating racks 110, 114 and 116. If the pin 135 is in engagement with the notch 137 the pinions 151 of the rear totalizer are normally in engagement with the actuating racks. The cam groove 140 is so constructed that the pitman 138 is first moved rearward before the actuating racks begin their movement from normal position so that the engaged totalizer is moved out of engagement with the actuating racks. Then while the actuating racks are in their differentially moved position and before they begin their return movement to normal the pitman 138 is moved forwardly to normal position to engage the selected totalizer with the actuating racks so that upon return movement of racks to normal position the engaged totalizer will be actuated accordingly.

The means for selecting the desired totalizer for operation will now be described. A lever 144 (Fig. 24) is rigidly mounted on a shaft 145 journaled in the frame 128. The lever 144 carries a leaf spring 142 projecting between two pins 146 on the pitman 138. Fast on the shaft 145 is a lever 141 (Fig. 3) having notches 147 formed in its ends. Two clerks' keys 148 are slidably mounted in the frame 128 and carry pins 149 projecting through the notches 147. When one of the keys 148 is pushed inwardly to effective position the other key is moved forwardly through the lever 141. In Fig. 3 the lower key is shown in effective position. When the lower key 148 is moved inwardly to the position shown in Fig. 3 the shaft 145 is rocked counter-clockwise (Figs. 3 and 24) whereupon the spring 142 engages the upper pin 146. In this manner the spring 142 is tensioned so that it tends to elevate the forward end of the pitman 138. When the upper key 148 (Fig. 3) is pressed inwardly the shaft 145 is rocked clockwise (Fig. 24) whereupon the spring 145 engages the lower pin 146 and tends to lower the forward end of the pitman 138. When the spring is in the position shown in Fig. 24 it can be seen that the notch 136 in the pitman 138 is retained in engagement with the stud 134 upon operation of the pitman 138 so that the forward totalizer will be moved out of and into engagement with the actuating racks. If the upper clerk's key 148 is pressed in the spring 142 being in engagement with the lower pin 146 lowers the forward end of the pitman 138, when the notch 137 is moved over the pin 135 upon rearward movement of the pitman 138 so that when the pitman is moved forwardly to normal position the rear totalizer will be moved into engagement with the actuating racks. In this manner the totalizers are selected for operation.

One arm of a lever 153 (Fig. 3) pivoted at 152 on the frame 128, engages in one of the notches 154 formed in an arm 155 fast on the shaft 145 to aline the shaft 145 in either one of its two positions. This arm of the lever 153 is retained in engagement with the arm 155 by a spring 156 compressed between another arm of the lever 153 and the frame 128. During movement of one of the keys 148, an arm 157 of the lever 153 moves in front of an arm 158 fast on the shaft 46 thereby locking the key coupler 36 against operation and hence preventing operation of the amount and no sale keys. When the key coupler 36 is operated by one of the amount keys or the no sale key the arm 158 moves under an arm 157 thereby locking the clerks' keys 148 against operation during operation of the machine.

*Transfer mechanism.*

Rigid with each totalizer pinion 120 (Figs. 5 and 16) are disks 160 and 163 for coöperating with a corresponding transfer pawl 164 and transfer lever 165 (Figs. 5 and 7) respectively. The pawls 164 and levers 165 are pivoted on the shaft 133 and the pawl and lever of each pair are rigidly connected together. The pawls 164 have recesses 168 for coöperating with projections 169 on the disks 163 associated with the rear totalizer and recesses 170 for coöperating with the projections 169 on the disks 163 associated with the front totalizer. The levers 165 have curved surfaces 173 and 174 for coöperating with the disks 160 of the rear totalizer and with curved surfaces 175 for coöperating with the disks 160 of the forward totalizer. The disks 160 of the forward and rear totalizers have recesses 176 adapted to be entered by points 177 and 178 (Fig. 7) respectively on the levers 165. The left hand side of the frame 91 controlled by the tens bank of keys and the right hand side of the frame 91 controlled by the hundreds bank of keys each carry a pin 180. The actuating racks 114 and 116 are each provided with a pin 183. The pins 180 and 183 engage the transfer levers 165 when the frames 90 and 91 are in their normal positions. When a transfer from one totalizer wheel to another is to be effected the projection 169 of the disk 163 fast to the totalizer wheel passing zero position coöperates with the notch 168 or 170 in the corresponding pawl 164 thereby rocking the pawl 164 and corresponding lever 165 clockwise (Fig. 5). The frame 91 of next higher denomination during its rearward movement is then arrested one step from normal or zero position by engagement of its pin 180 with the positioned lever 165 and through the pinions 93 the corresponding frame 90 is moved rearwardly one step past zero position to move the totalizer wheel in mesh with its actuating rack an extra step thereby effecting the transfer. As a totalizer wheel of the rear totalizer passes zero position the point 178 of the lever 165 projects into the recess 176 in the disk 160 fast to the wheel. When a totalizer wheel of the front totalizer passes zero position the point 177 of the lever 165 projects into the recess 176 formed in the disk 160 fast to the wheel. The surfaces 175, 173 and 174 engage the peripheries of the disks 163 to lock the levers 165 and pawls 164 against movement except when the totalizer wheels pass from their nine to their zero positions.

Figure 7:
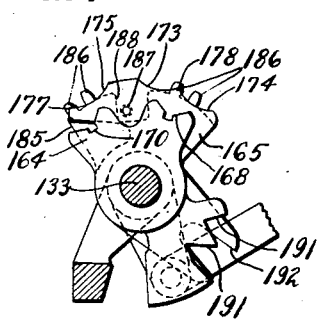
Fig. 7 is a detail side view of one of the transfer devices for the totalizer pinions of higher orders.

As shown there are six totalizer wheels in each totalizer, whereas but three actuating racks are provided. The transfer mechanism for carrying transfers to the three totalizer wheels of highest orders will now be described. For each of these totalizer wheels of highest orders there is provided a pawl 164 and transfer lever 165 (Figs. 1 and 7). Levers 185, one for each totalizer pinion of higher order are loosely mounted on the shaft 133 and have pairs of teeth 186 for coöperating with the pinions 151 fast to the totalizer wheels. Pins 187 on the levers 165 project through recesses 188 formed in the levers 185. When a totalizer wheel passes to zero position or beyond the clockwise movement of the pawl 164 and lever 165 through the pin 187 rocks the lever 185 for the totalizer wheel of next higher order in the same direction whereupon the pair of teeth 186 on the lever 185 moves the totalizer pinion meshing therewith one step to effect the transfer.

The transfer levers 165 (Fig. 5) for the totalizer wheels of lower orders are normally locked in either one of their two positions by a cross rod 190 of a yoke frame 193 pivoted on the frames 127. A rearwardly extending arm on the yoke frame 193 carries a roller 194 (Fig. 13) projecting into a cam groove formed in a disk 195 fast on the shaft 50. The cam groove is so constructed that the frame 195 is rocked near the beginning of the operation of the machine to move the cross bar 190 out of engagement with the notches 191 and then near the end of the operation of the machine and before the totalizer is rocked out of engagement with the actuating racks the yoke frame 193 is moved back to normal position to move the cross bar 190 into engagement with the notches 191 thereby locking the transfer levers 165 in either of their two positions. The bar 190 projects through slots 192 (Fig. 7) in the levers 185 to limit the movement of the latter.

Figure 9:
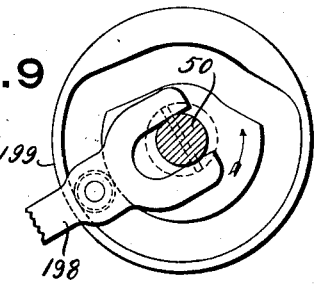
Fig. 9 is a detail side view of the cam for operating the restoring device for the transfer mechanism.

The transfer levers 165 and pawls 164 are restored to normal position during the forward movement of the actuating racks by the following described device. A yoked frame 196 (Figs. 1 and 5) is loosely mounted on the shaft 133 and an arm 197 (Fig. 1) also loose on the shaft is connected to the left hand hub of the frame 196. Pivoted to the arm 197 is a pitman 198 which carries a roller (Fig. 9) projecting into a cam groove formed in a disk 199 fast on the shaft 50.

This cam groove is so constructed that the yoked frame 196 is rocked counter-clockwise (Fig. 5) during the forward movement of the actuating racks whereupon the cross bar 200 of the frame 196 engages the levers 165 to restore them to normal position. When the levers 165 for the totalizer wheels of higher orders are restored to normal position the pins 187 engage the forward sides of the recesses 188 in the levers 185 and restore the latter to normal position.

*Means retaining totalizer wheels in adjusted positions.*

Loosely mounted on the shafts 123 (Figs. 14 and 16) and between the disks 160 and pinions 151 are disks 203 having projections 204 projecting into grooves 205 formed in the shafts 123. Loosely mounted on the right hand ends of the shafts 123 are sleeves 206 (Fig. 16) having disks 207 fast on their left hand ends and arms 208 (Figs. 16 and 24) fast on their right hand ends. Balls 209 (Fig. 16) are seated in recesses formed in the hubs of the arms 208. The balls are adapted to coöperate with recesses 210 formed in disks 213 fast on the totalizer frame 124. Springs 214 coiled about the sleeves 206 are interposed between the disks 207 and the totalizer frame 124. The balls 209 are normally in engagement with the recesses 210 which are not as deep as the recesses in which the balls are seated in the arms 208. After the selected totalizer has been moved into engagement with the actuating racks and before the latter begin their movement to normal position the corresponding arm 208 and sleeve 206 are rocked as will be described later, thereby moving the balls 209 out of engagement with the recesses 210. This movement of the balls 209 slides the sleeve 206 toward the right against the action of the spring 214.

From the above description it can be seen that normally the spring 214 retains the balls 209 in engagement with the recesses 210 and therefore the disks 160 and the pinions 151 are firmly retained in frictional engagement with the disks 203 thereby frictionally retaining the totalizer wheels in their adjusted positions. When the totalizer is to be actuated the balls 209 are moved out of engagement with the recesses 210 by the rocking of the corresponding arm 208 thereby moving the sleeve 206 and disk 207 toward the right to eliminate the friction which exists between the pinions 151 and disks 160 and the disks 203 due to the action of the spring 214. Therefore the totalizer wheels can be rotated more easily by the actuating racks. Before the totalizer is rocked out of engagement with the actuating racks after the racks have been returned to normal position, the arm 208 is restored to normal position so that the totalizer wheels be held frictionally in moved positions by the disks 203.

The means for rocking the arm 208 for the selected totalizer will now be described.

The arms 208 carry pins 218 (Fig. 24) adapted to engage in corresponding notches 219 formed in an arm 220 pivoted on the shaft 133. The arm 220 is pivoted to a pitman 223 carrying a roller 224 which projects into a cam groove 225 formed in a disk 226 fast on the shaft 50. When the selected totalizer is moved into engagement with the actuating racks, as above described, the corresponding pin 218 is moved into engagement with the appropriate notch 219 and then before the racks begin their return movement to normal position the arm 220 is rocked by the cam groove 225 through the pitman 223 to rock the arm 208 of the engaged totalizer. This movement of the arm 208 through the balls 209 (Fig. 16) moves the sleeve 206 so that the spring 214 does not retain the totalizer elements in frictional engagement with the disks 203, as above described.

*Turn to zero mechanism.*

Fast on the shafts 123 (Figs. 16 and 25) are pinions 228 meshing with a pinion 229 loose on a stud 230 mounted in the totalizer frame 124. Fast on the pinion 229 is a milled thumb disk 233 which when manually turned rotates the totalizer shafts 123 and the disks 203 through the pinions 228 and 229. Rotation of shafts 123 of the totalizer not in engagement with the actuating racks rotates the totalizer wheels of this totalizer to zero position, the totalizer elements being pressed against the disk 203 by the spring 214. The totalizer wheels of the engaged totalizer are prevented from being rotated by the rotation of the corresponding shaft 123 and disks 203 by the engagement of the pinions 151 on the totalizer wheels with the actuating racks and the teeth 186 on the levers 185. When the totalizer which is in engagement with the actuating racks is to be turned to zero the corresponding clerk's key is pressed in and then the "no sale" key is operated to operate the machine so that during the operation the totalizer is rocked out of engagement and retained out of engagement with the actuating racks. Then when the thumb disk 233 is operated this particular totalizer is turned to zero.

When the totalizer wheels of the front totalizer reach zero position they are arrested in such position by engagement of pins 235 (Figs. 16 and 25) on the totalizer wheels with projections 236 (Figs. 15, 16 and 25) on a bar 237. When the rear totalizer is turned to zero the totalizer wheels are arrested in zero position by engagement of their pins 235 with projections 238 on the bar 237. The bar 237 is slidably mounted in the totalizer frame and the projections 236 and 238 are normally held out of the path of movement of the pins 235 by a compressed spring 239 (Fig. 16) to permit operation of the totalizers by the actuating racks. When the thumb disk 233 is rotated the inclined side of a notch 243 (Fig. 16) formed in a disk 244 fast to the pinion 229 and disk 233 moves the bar 237 toward the right against the action of the spring 239, thereby moving its projections into the path of movement of the pins 235 on the totalizer wheels near the very beginning of the rotation of the thumb disk 233.

A spring operated pawl 246 (Fig. 25) engages the milled disk 233 to permit rotation of the latter only in the direction of the arrow shown in this figure. A nose 247 of a lever 248 projects into a recess 249 formed in the milled disk 233 so that when the latter is rotated to reset a totalizer the lever 248 is rocked counter-clockwise, thereby moving its projection 250 into engagement with a notch 253 formed in a disk 254 fast on the shaft 50. When the disk 233 reaches normal position the recess 249 is over the nose 247 and the weight of the rear end of the lever 248 rocks the latter to normal position to move its projection 250 out of the notch 253. It can be seen that while the projection 250 is in engagement with the notch 253 the machine is locked against operation and therefore the machine cannot be operated while a totalizer is being turned to zero. Furthermore, during operation of the machine the notch 253 is moved from above the projection 250 thereby locking the resetting mechanism against operation during operation of the machine.

The following described device is employed to arrest the resetting mechanism in normal position when a totalizer has been turned to zero: A lever 256 (Fig. 25) is provided with a slot 257 through which projects a stud 258 on which the lever 248 is pivoted. When the thumb disk 233 approaches normal position a nose 259 of the lever 256 engages in the recess 249 in the disk 233 and the lever is slid on the stud 258 so that its lower end engages the key coupler 36. As the forward end of the slot is in engagement with the stud 258 when the disk 233 reaches normal position, it can be seen that the turn button is arrested in normal position in this manner. During the first operation of the machine after a totalizer has been turned to zero the lever 256 is rocked by the key coupler 36 to move the nose 259 out of the recesses 249 whereupon a spring 260 moves the lever 256 forwardly to normal position so that the nose 259 of the lever 256 engages the periphery of the thumb disk 233.

*Clerks' indicator.*

Fast on the shaft 145 (Fig. 24) is an arm 265 connected by a link 266 to a bell crank 267. The bell crank is connected by a link 268 to an arm 269 (Fig. 19) fast on a shaft 270 carrying a clerks' indicator 273. The clerks' indicator 273 is in the form of a block bearing on its sides the letters A and B as indicated adjacent the indicator in the figure last mentioned. It is obvious from this description that when one of the clerks' keys 148 (Fig. 3) is operated to select a totalizer for operation the indicator 273 (Fig. 19) is rotated to display the corresponding clerk's initial through suitable openings in the cabinet of the machine.

Clerks' drawers.

Two drawers 275 (Figs. 2 and 3), one for each clerk, are slidably mounted in the usual manner in the machine. The drawers 275 are latched within the machine by the engagement of the back of the drawers with shoulders 276 on corresponding arms 277 pivoted on the shaft 35. Each arm 277 carries a pin 278 adapted to coöperate with a corresponding projection 279 formed on the lower end of a pitman 280. The upper end of the pitman 280 (Fig. 4) is provided with a slot through which the shaft 50 projects. The pitman 280 (Fig. 3) carries a pin 284 projecting into a slot 285 formed in a link 286 pivoted at 287 to an arm 288 (Figs. 3 and 24) of the lever 144. When the lower clerks' key 148 (Fig. 3) is pressed in the pitman 280 is rocked to move the rear projection 279 under the pin 278 on the arm 277 for the right hand drawer. Then during operation of the machine the pitman 280 is raised by the engagement of a pin 281 on the cam disk 143 with a flange 283 on the pitman (Fig. 4) to move the shoulder 276 on this lever out of engagement with the back of the right hand drawer whereupon a drawer spring 290 moves the drawer forwardly. When the upper clerk's key 148 is pressed in the link 286 rocks the pitman 280 to move the forward projection 279 under the pin 278 on the left hand arm 277 so that during operation of the machine this arm is raised to permit the opening of the left hand drawer.

Transaction keys.

The transaction keys 34 (Figs. 1, 18 and 21) are made in two parts 295 and 297 each pivoted on the rod 35, but only one of which is adapted to be connected to the key coupler 36 after a manual depression of the other part. Thus it is unnecessary to depress the transaction key simultaneously with the amount keys and the forward or manually operated parts 295 of the transaction keys are not required to make as long a stroke as is the case with the amount keys.

The forward part 295 of each transaction key extends slightly rearward of the rod 35 and its rear end is provided with a lug or flange 296 extending below the rear part 297 of the key. The forward part 295 of the key is not depressed as far as the amount keys and during this depression of the part 295 its flange 296 engages the part 297 to raise the rear end of the latter a slight distance.

After the forward end of a transaction key has been depressed it is latched in such position by the following described device: A latching plate 299 (Fig. 18) has vertical sides 300 by which it is pivoted to projections on a cross frame 301. The plate 299 is retained in engagement with the upper edges of projections 303 on the parts 295 of the transaction keys by a spring 304. The projections 303 are so constructed that when the part 295 of a transaction key is depressed the plate 299 is rocked slightly against the action of the spring 304 until the upper edge of the projection moves out of engagement with the plate. Then the spring rocks the plate to normal position so that its rear edge engages the forward end 305 of the projection 303 thereby latching the key in depressed position. If another transaction key is depressed before operation of the machine the plate 299 is moved to release the previous depressed key and latches the key last depressed in depressed position. The rear parts 297 of the transaction keys are provided with recesses 306 which are considerably wider than the recesses 48 formed in the amount and no sale keys. When a transaction key is depressed, as above described, the lower side of the recess 306 formed in the rear part of the key engages the lower edge of the shoulder 47 of the key coupler 36 and the upper edge of the recess projects over the shoulder 47 so that when the key coupler 36 is operated by an amount key the rear part 297 of the depressed transaction key is given its full movement with the key coupler independently of the forward part of the key. Fast on the shaft 46 (Figs. 18 and 21) is an arm 308. A pawl 309 is pivoted at 311 to the arm 308. A spring 310 is interposed between pins on the arm 308 and pawl 309 and normally retains the pawl 309 in engagement with a pin 313 on the left hand side frame of the machine. When the key coupler and the arm 308 are rocked clockwise (Fig. 21) by an amount key the pawl 309 is moved away from the pin 313 whereupon the spring 310 rocks the pawl 309 clockwise about its pivot. Then during counter-clockwise movement of the arm 308 to normal position an arm 314 of the pawl 309 engages under the plate 299 at the same time that the pawl engages the pin 313 so that as the pawl is rocked counter-clockwise about its pivot by the pin 313 it raises the plate 299 out of engagement with the end 305 of the projection 303 on the operated transaction key to permit return movement of the latter to normal position.

As the arm 314 passes out of engagement with the plate 299 the spring 304 restores the plate 299 to normal position. The forward parts 295 of the transaction keys are depressed against the action of corresponding springs 312 which restore the forward parts of the keys to normal position.

The edges 315 (Fig. 18) on the forward parts 295 of the transaction keys are adapted to engage the inclined or conical surfaces of disks 316 (Fig. 20) fast on a sleeve 317 which is loose on a rod 318 mounted in the frame 301. These disks 316 are so constructed that when the forward part 295 of a transaction key is depressed its edge 315 engages one of the disks 316 thereby sliding the sleeves 317 on the rod 318. As the edge 315 of the depressed key engages between two of the disks 316 it can be seen that the disks 316 are held in moved position. At such time the disks 316 are under the parts 295 of the two transaction keys which have not been operated, and therefore, prevent operation of these keys. This means is therefore provided to permit the operation of but one transaction key at a time.

Totalizer throwout.

A yoke 320 (Figs. 18 and 21) is loosely mounted on the cross rod 35 and its horizontal cross bar normally rests on the upper edges of the forward parts 295 of the transaction keys so that when any transaction key is operated the yoke 320 is rocked counter-clockwise as viewed in Fig. 18. One side of the yoke 320 is connected by a link 324 to an arm 325 fast on the shaft 133 so that when the yoke 320 is operated by depression of the part 295 of a transaction key the shaft 133 and plates 131 are rocked counter-clockwise (Fig. 18). The slots 130 in the plates 131 are so constructed that when the plates are rocked counter-clockwise, as above described, the totalizer frame 124 is elevated to raise the totalizer, which is in engagement with the racks before the key is operated out of engagement therewith so that during the operation of the machine neither of the totalizers is operated. The slots 126 in the frames 127 are provided to permit elevation of the totalizer frame 124 in the manner just described. When the forward part 295 of the operated transaction key is restored to normal position by its spring 312 a spring 326 interposed between the yoke 320 and the base of the machine restores the yoke and associated parts to normal position so that one of the totalizers is moved into engagement with the actuating racks which at such time are in normal position.

Printing mechanism.

Amount type carriers 328 (Figs. 5 and 22) are loosely mounted on a shaft 329 and are rigid with pinions 330 meshing with the actuating racks 110, 114 and 116. Therefore the movement of the actuating racks is imparted to the amount type carriers. A clerk's type carrier 334 (Fig. 22) is fast on the shaft 329 which carries an arm 335 (Figs. 18 and 22) connected by link 336 to an arm 337 (Figs. 1 and 18) fast on the shaft 145 operated by the clerks' keys 148 as above described. Through these connections the clerk's type carrier 334 is rotated into position to print the clerk's initial appropriate to the clerk's key moved to effective position. A transaction type carrier 338 (Fig. 22) is loose on the shaft 329 and carries a pinion meshing with teeth 340 (Fig. 18) on a rack 343. The forward end of the rack 343 is provided with a slot 344 through which a pin 345 on one of the frames 127 projects to guide the rack. The rear end of the rack 343 is pivoted to an arm 346 fast on a plate 347 pivoted by ears 348 to the side frames of the machine. The rear ends of the rear parts 297 of the transaction keys are graduated in length so that when one of these transaction keys is operated the inclined edge 349 of its rear end engages the plate 347 to rock the latter differentially about its pivots thereby moving the rack 343 forwardly to position the transaction type carrier 338 accordingly. As shown in Fig. 3 the rear end of the "no sale" key 30 extends farther rearward than the rear parts 297 of the transaction keys so that it also is adapted to coöperate with the plate 347 to move the transaction type carrier 338 (Fig. 22) into position to print characters representing "no sale". When the operated transaction key or "no sale" key is moved to normal position out of engagement with the plate 347 a spring 350 (Fig. 3) restores the plate 347 and therefore the transaction type carrier to normal position in which position of the type carrier no character is at the printing line. It is understood, of course, that the amount keys, which do not extend as far rearwardly as the "no sale" key and the parts 297 of the transaction keys do not engage the plate 347.

Figure 28:
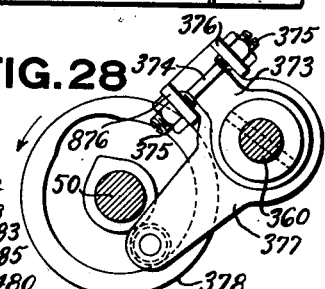
Fig. 28 is a detail view of the cam and connections for operating the platen of the printing mechanism shown in Fig. 5.

A platen 353 (Fig. 5) is lowered to carry a detail strip 354 against the printing line of the type carriers. A supply roll 355 for the detail strip is mounted on a stud 356 projecting from a plate 357. The detail strip is fed from the supply roll 355 about the platen 353 onto a storage roll 358 fast on a shaft 361 journaled in the plate 357. The plate 357 has a recess 359 engaging over a shaft 360 journaled in the frames 127. The platen 353 is loose on a rod 363 projecting from the plate 357. The rod 363 projects through recesses 364 formed in the forward ends of two arms 365 fast on the shaft 360. The plate 357 is therefore supported by the shaft 360 and the arms 365. Only one of these arms is shown in the drawings. A lever 366 is loosely mounted on the rod 363 and at its rear end has a nose 367 normally engaging a pin 368 projecting from the left hand arm 365 to hold the plate 357 on the shaft 360 and the arm 365. When it is desired to insert the supply roll or detach the storage roll the lever 366 is rocked counter-clockwise (Fig. 5) to move the nose 367 out of engagement with the pin 368 whereupon the plate 357 may be withdrawn from the machine by a handle 371 on the plate. The lever 366 is retained in the normal position shown in Fig. 5 by a spring 369 interposed between the handle 371 and a lug or projection 370 on the lever 366. Fast on the shaft 360 (Fig. 28) is an arm 373 having a projection or flange 374 engaged at its ends by screws 375 carried in projections 376 on a lever 377 which is pivoted on the shaft 360. The lever 377 carries a roll projecting into the cam groove formed in a disk 378 fast on the shaft 50. This cam groove is so constructed that while the type carriers are in their differentially moved positions the arms 365 and therefore the plate 357 are rocked counter-clockwise (Fig. 5) so that the platen 353 carries the detail strip 354 against the printing line of the type carriers to print on the strip. The screws 375 may be adjusted to effect a relative adjustment between the arm 373 and lever 377 so that the platen will strike the type carriers with the desired force to make a perfect impression on the strip.

Figure 8:
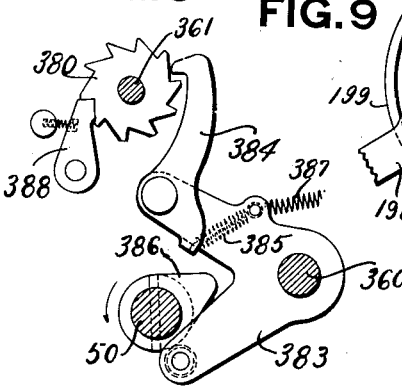
Fig. 8 is a detail side view of the device for operating the storage roll upon which the detail strip is fed.

Fast on the shaft 361 (Figs. 5 and 8) carrying the storage roll 358 is a ratchet 380. Loosely mounted on the shaft 360 (Fig. 8) is a bell crank 383 upon which is pivoted a pawl 384 for coöperating with the ratchet 380. A spring 385 interposed between a pin on the lever 383 and a projection on the pawl 384 retains the pawl in normal position relative to the lever and in this position the lug on the pawl engages the lower edge of the arm of the lever on which the pawl is pivoted. The bell crank 383 carries a roller engaging a cam 386 fast on the shaft 50. The cam 386 is so constructed that upon each operation of the machine the bell crank 383 is rocked against the action of its spring 387 whereupon the pawl 384 coöperates with the ratchet 380 to rotate the storage roll and thereby feed the detail strip upon the latter. A spring pressed retaining pawl 388 (Fig. 8) coöperates with the ratchet 380 to prevent retrograde movement of the storage roll.

An inking ribbon 390 (Fig. 22) through which the type carriers print on the detail strip may be wound from either one of two spools 393 onto the other, an automatic reversible feeding mechanism being provided. The ribbon 390 and spools 393 are omitted in Fig. 5. The spools 393 are fast on stub shafts 394 journaled in projections 395 of the frames 127. The shafts 394 carry bevel gears 396 adapted to mesh with corresponding bevel gears 397 fast on a shaft 398 slidably mounted in the frames 127. The bevel gears 397 are so mounted on the shaft 398 that but one of them at a time meshes with its corresponding bevel gear 396. A hub 391 of a ratchet 399 loose on the shaft 398 has slots 392 through which a pin 401 on the shaft 398 projects so that the ratchet is rotated with the shaft and the shaft may be shifted independently of the ratchet. A pawl 400 (Figs. 5 and 22) pivoted on an arm 403 loose on the shaft 398 is retained in engagement with the ratchet 399 by a spring 404. The arm 403 engages in a groove 405 (Fig. 22) in a pin 406 to prevent lateral movement of the arm 403 and ratchet 399. The arm 403 (Fig. 5) carries a pin 407 engaging in the recess 408 formed in one arm of a lever 409 pivoted on the shaft 360. The other arm of the lever 409 is forked over the shaft 88 so that when the shaft 88 is moved forwardly and then rearwardly to normal position the arm 403 is rocked clockwise and then counter-clockwise to normal position. During counter-clockwise movement of the arm 403 the pawl 400 rotates the ratchet 399 and shaft 398. This movement of the shaft 398 through the pair of intermeshing bevel gears 396 and 397 rotates the corresponding spool 393 to feed the inking ribbon thereon.

The inking ribbon passes over a plate 410 (Fig. 22) pivoted on the shaft 398 and under fingers 413 formed on the plate. Near each end of the inking ribbon is a pin 414 (Fig. 23) sewed in the ribbon. The ends of the ribbon are fastened by pins 411 to cloth strips 412 sewed on rods 421 mounted on the spools 393. When the ribbon on the spool 393 which has been serving as a supply spool is nearly exhausted the pin 414 near the end fastened to this spool engages the fingers 413 whereupon the ribbon on the other spool is tensioned when the latter is rotated. In order positively to prevent shifting of the shaft 398 while an impression is being taken and to cause the ribbon on the spool serving as the storage roll to be tensioned during an operation in which the engagement of the pairs of gears 396 and 397 is to be reversed a disk 417 (Fig. 22) fast on the shaft 398 coöperates with a disk 418 (Figs. 5 and 22) fast on the shaft 50. As shown in Fig. 5 the disk 418 is cut away so that there is normally clearance between the two disks. When, however, an impression is being taken and the storage roll is being rotated the two disks overlap and therefore the plate 410 can not be shifted and the ribbon on the storage roll is tensioned. When the disk 418 reaches normal position the disks no longer overlap and therefore at such time the plate 410 is shifted due to tensioning of the ribbon. A collar 415 is fast on the shaft 398 between the ears of the plate 410 by which the latter is pivoted on the shaft 398 so that when the plate 410 is shifted as described above, the shaft 398 is shifted at the same time to reverse the engagement of the pairs of gears 396 and 397. As shown in Fig. 22 the left hand spool 393 is serving as a storage roll as its gear 396 is in mesh with the corresponding gear 397. When the ribbon on the right hand spool 393 is nearly exhausted the pin 414 engages the right hand fingers 413 and the ribbon on the right hand spool is tensioned so that at the end of the operation the shaft 398 is shifted toward the left to disengage the left hand gear 397 from its corresponding gear 396 and engage the right hand gear 397 with the corresponding gear 396. Therefore, during the succeeding operations of the machine the right hand spool 393 is rotated so that the ribbon is fed upon the same and is fed off of the left hand spool 393.

In order to insure shifting of the shaft 398 and therefore not depend entirely on the tensioning of the ribbon and also to insure engagement of a pair of gears 396 and 397 when the feed is not to be reversed the periphery of the disk 417 is beveled on each side and the disk 418 has a double bevel at 4181. It can be seen from this construction that if the tension of the ribbon has not completely shifted the shaft 398 when the engagement of the pairs of gears is to be reversed one side of the double bevel on the disk 418 at the next operation engages the bevel on the opposite side of the disk 417 and therefore completes the shifting of the shaft 398. On the other hand, if the shaft 398 should be shifted a little when the feed is not to be reversed it is shifted back to its proper position by the coöperation of one side of the bevel on the disk 417 with the bevel on the opposite side of the disk 418 so that during rotation of the shaft 398 the gears 396 and 397 are positively held in engagement.

Figure 26:
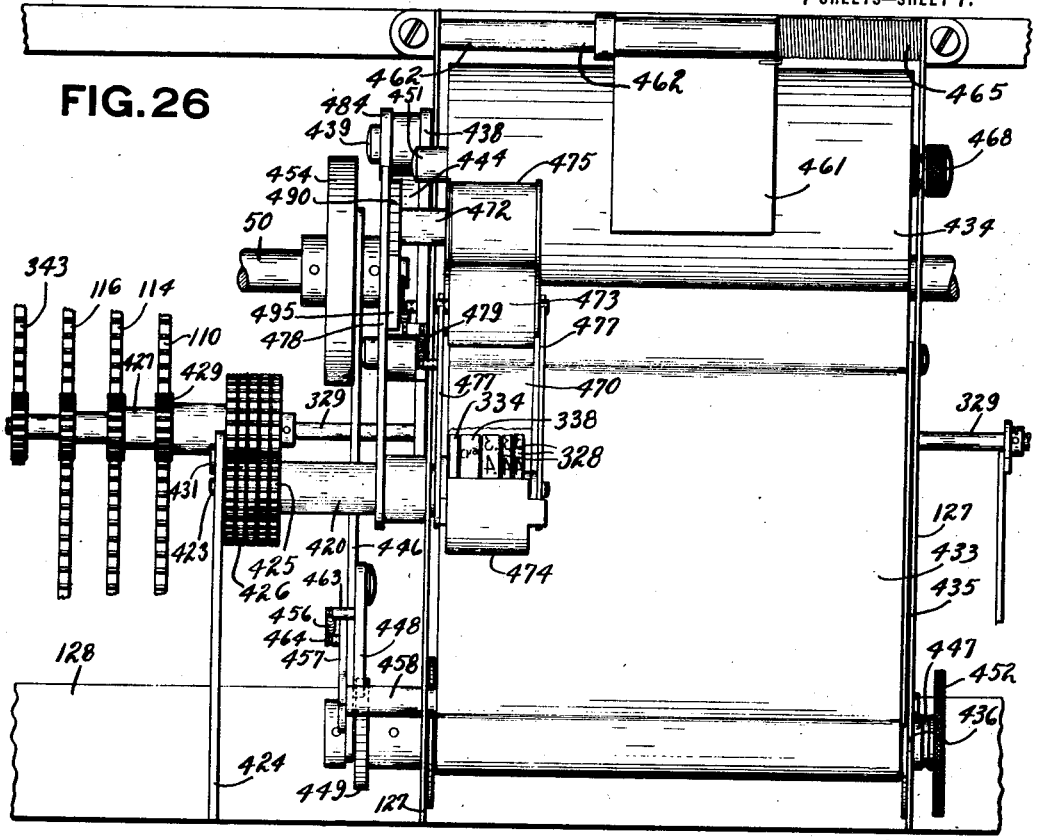
Fig. 26 is a detail top plan view of a modified form of printing mechanism adapted for use with the present invention.
Figure 29:
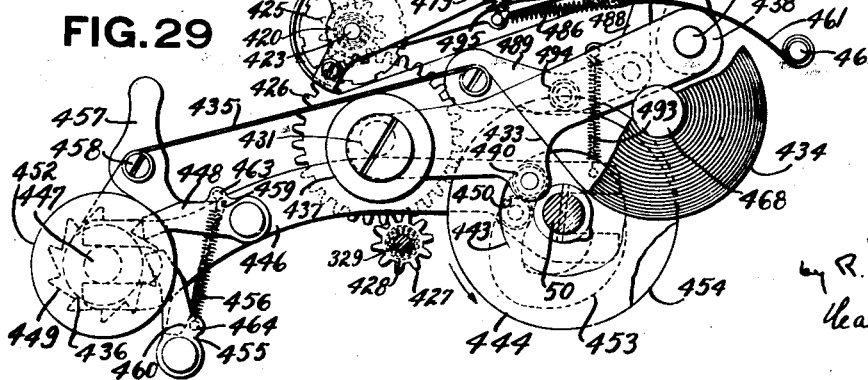
Fig. 29 is a detail side view of the printing mechanism shown in Fig. 26 with the supporting frames omitted.

Figs. 26 and 29 show a modified form of printing mechanism which is adapted for use with the present invention. This printing mechanism is so constructed that any desired autographic record may be made on the detail strip opposite the printing impressions made by the type carriers. In this modified form the amount type carriers 328, the transaction type carrier 338 and the clerk's type carrier 334 are fast on nested sleeves 420 loose on a rod 423 supported in frames 424 and 127 which are shown in Fig. 26 but omitted in Fig. 29. The sleeves 420 carry pinions 425 meshing with gears 426 which in turn mesh with pinions 427 (Fig. 29) fast on sleeves 428 (Figs. 26 and 29) and the shaft 329. The gears 426 are pivoted on a stud 431 projecting from the frame 424. The sleeves 428 carry pinions 429 meshing with the racks 110, 114 and 116 and the rack 343 positioned under the control of the amount and transaction keys respectively as above described. The gear 426 meshing with the pinion 425 on the sleeve carrying the clerk's type carrier 334 meshes with the pinion 427 which is fast on the shaft 329 adjusted by the clerks' keys 148, as above described. Through these connections the type carriers are positioned under the control of the operated keys.

The detail strip 433 is fed from a supply roll 434 over a writing table 435 on to a storage roll 436. A platen 437 for carrying the detail strip 433 against the type carriers is mounted on an arm 438 loose on a stud 439 projecting from the left hand frame 127. The arm 438 carries a roller 440 projecting into a cam groove 443 formed in a disk 444 fast on the shaft 50. The cam groove 443 is so constructed that the platen 447 carries the detail strip 433 against the printing line of the type carriers while the latter are in adjusted positions. The table 435 is provided so that autographic records may be written opposite the printed amounts, it sometimes being desirable to make more extended records of transactions than is permitted by the keys.

Shafts 451 and 447, carrying the supply and storage rolls 434 and 436 respectively, are mounted in the frames 127. A pitman 446 is forked at its rear end over the shaft 50 and at its forward end over the shaft 447. The pitman carries a pawl 448 engaging a ratchet 449 fast on the shaft 447. A roller 450 on the pitman 446 engages in a cam groove 453 formed in a disk 454 fast on the shaft 50. This cam groove is so constructed that the pitman 446 is reciprocated upon each operation of the machine whereupon the pawl 448 through its coöperation with the ratchet 449 rotates the storage roll 436 to feed the detail strip upon the latter. A retaining pawl 455 pivoted on a stud on the left hand frame 127 engages the ratchet 449 to prevent backward rotation of the storage roll 436. A spring 456 interposed between the pawls 448 and 455 retain the latter in engagement with the ratchet 449. A plate 461 mounted on a rod 462 is retained in engagement with the detail strip on the supply roll by a coil spring 465 to retard movement of the supply roll so that the momentum of the latter will not unwind any more paper than is wound on the storage roll. The storage roll may be rotated by a turn disk 452 to wind the detail strip on the storage roll by hand when desired.

A lever 457 pivoted on a rod 458 supporting the forward end of the table 435 has edges 459 and 460 which engage pins 463 and 464 on the pawls 448 and 455 respectively to move the pawls out of engagement with the ratchet 449 when the lever 457 is operated so that the record strip may be unwound from the storage roll onto the supply roll which at such time may be rotated by a turn button 468 on the shaft 451.

The ink ribbon 470 through which the type carriers print on the detail strip 433 is fed from a supply roll 473 about a semicircular guide or shield 474 onto a storage roll 475. The rod carrying the supply roll 473 projects into recesses 476 formed in arms 477 loose on the shaft 423 and the outermost sleeve 420. These arms 477 also carry the shield 474. The storage roll 475 is fast on a shaft 472 journaled in an arm 478 loose on the outermost sleeve 420. A spring 479 retains the supply roll in engagement with the storage roll 475. The arm 478 rests on a stud 480 and a nose 483 on an arm 484 projects over a shoulder 485 on the arm 478 to hold the latter against movement. When it is desired to change or inspect the inking ribbon the arm 484 is rocked manually against the tension of its spring 486 and then the arm 478 is rocked manually so that easy access may be had to the storage and supply rolls.

A pawl 488 pivoted on an arm 489 is retained in engagement with a ratchet 490 fast on the shaft 472 carrying the storage roll 475 by a spring 493. The arm 489 is pivoted on the rear rod 458 and carries a roller 494 engaging the periphery of the disk 444. The periphery of this disk 444 forms a cam which is so constructed that the pawl 448 is raised at each operation of the machine to operate the storage roll. A pawl 495 is retained in engagement with ratchet 490 by a spring 496 to prevent backward rotation of the storage roll 475.

Operation.

It is thought that the above description is sufficient for a complete understanding of the invention but a résumé of the operation will be given here.

When the amount keys are depressed their edges 106 are first raised into the path of movement of the corresponding steps 105 on the frames 90 and 91 and then movement of the studs 119 in the slots 121 of the arms 117 moves the shaft 88 forwardly. During such movement of the shaft 88 the pinions 93 on the shaft through their engagement with the racks 94 and 95 on the frames 90 and 91, respectively, move the frames forwardly. During this forward movement of the frames their appropriate steps 105 engage the edges 106 of the operated keys to arrest the frames 90 when the latter have moved extents commensurate to the values of the keys depressed while the frames 91 are arrested when they have moved to complementary extents. Before movement of the frames 90 from normal position is begun the totalizer in engagement with the actuating racks 110, 114 and 116 before the keys are depressed is moved out of engagement and then after the actuating racks have been differentially positioned the pitman 138 is restored to normal position to move the selected totalizer into engagement with the racks so that the selected totalizer is operated during return movement of the racks to normal position.

When one of the clerks' keys 148 is pressed in the pitman 280 (Fig. 3) is rocked to move one of its projections 279 under the pin 278 on the arm 277 locking the appropriate clerk's drawer 275 within the machine so that when the pitman 280 is raised during operation of the machine the arm 277 is rocked to permit the opening of the drawer by its spring 290. When a clerk's key is pressed in the leaf spring 142 (Fig. 24) is moved out of engagement with one of the pins 146 and into engagement with the other pin 146 so that during operation of the machine the clerk's totalizer corresponding to the clerk's key depressed is moved into engagement with the actuating racks and operated thereby.

During operation of the amount and transaction keys the amount type carriers 328 and the transaction type carrier 338 are differentially positioned as fully described above and then the platen 353 (Fig. 5) is lowered to make an impression from the type carriers on the detail strip 354. The clerk's initial is also printed on the detail strip by the type carrier 334 which is positioned when the clerk's key is pressed into effective position as above described.

When a transaction key is operated manual movement of its forward end 295 through the yoke 320, link 324, arm 325, and shaft 133 rocks the plates 131 to raise the totalizer frame so that during operation of the machine a totalizer is not operated. Depression of the forward part 295 of the transaction key slightly rocks the rear part 297 of the key so that during the depression of an amount key the part 297 is operated by the key coupler 36.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with an accounting device, of a pair of members movable to complementary extents for actuating the account device, means movable to an invariable extent for operating said members, and keys for moving said means and controlling the extents of movement of said members.

2. In a machine of the class described, the combination with an accounting device, of a pair of members movable in the same direction for actuating the accounting device, means movable to an invariable extent for operating said members, and keys for moving said means and controlling the extents of movement of said members.

3. In a machine of the class described, the combination with an accounting device, of a pair of members movable to complementary extents for actuating the accounting device, means movable to an invariable extent for operating said members, and keys for moving said means and adapted to be engaged by said members for the purpose of limiting movements of the latter.

4. In a machine of the class described, the combination with an accounting device, of a pair of members movable in the same direction to complementary extents for actuating the accounting device, means movable to an invariable extent for operating said members, and keys for moving said means and adapted to be engaged by said members for the purpose of limiting movements of the latter.

5. In a machine of the class described, the combination with an accounting device, of a plurality of pairs of members for operating said accounting device, the members of each pair being movable to complementary extents, means movable to an invariable extent for operating said members, a bank of keys for each pair of members for moving said means, and controlling the extents of movement of said members, and a device for each bank of keys for preventing movement of one member of the corresponding pair and disabled when a key of the corresponding bank is operated.

6. In a machine of the class described, the combination with an accounting device, of a plurality of pairs of members for operating said accounting device, the members of each pair being movable in the same direction to complementary extents, means movable to an invariable extent for operating said members, a bank of keys for each pair of members for moving said means and controlling the extents of movement of said members, and a device for each bank of keys for preventing movement of one member of the corresponding pair and disabled when a key of the corresponding bank is operated.

7. In a machine of the class described, the combination with an accounting device, of a pair of members movable to complementary extents for actuating the accounting device, a rack on each member, a pinion engaging said racks and movable to an invariable extent whereby said members are operated, and keys for moving said pinion to an invariable extent and controlling the extents of movement of said members.

8. In a machine of the class described, the combination with an accounting device, of a pair of members movable to complementary extents for actuating the accounting device, a rack on each member, a pinion engaging said racks and movable to an invariable extent whereby said members are operated, and keys for moving said pinion an invariable extent and adapted to be engaged by said members to limit the extents of movement of said members.

9. In a machine of the class described, the combination with an accounting device, of a pair of complementary stepped members movable to complementary extents for actuating the accounting device, means movable to an invariable extent for operating said members, and keys for moving said means and coöperating with the complementary steps on said members to control the extents of movement of said members.

10. In a machine of the class described, the combination with an accounting device of a pair of members having complementary steps and movable in the same direction for actuating the accounting device, means movable to an invariable extent for operating said members, and keys for moving said means and coöperating with the complementary steps on said members to control the extents of movement of said members.

11. In a machine of the class described, the combination with an accounting device, of a pair of members having complementary steps and movable to complementary extents to actuate said accounting device, a rack on each member, a pinion engaging said racks and movable to an invariable extent whereby said members are operated, and keys for moving said pinion to an invariable extent and adapted to coöperate with the steps on said members to control the extents of movement of the latter.

12. In a machine of the class described, the combination with an accounting device, of a pair of members movable to complementary extents for actuating the accounting device, of means movable to an invariable extent for operating said members, keys controlling the extents of movement of said members, and a key coupler operated by said keys and constructed to operate said invariably movable means.

13. In a machine of the class described, the combination with an accounting device, of a pair of members having complementary steps and movable to complementary extents for actuating the accounting device, of means movable to an invariable extent for operating said members, keys adapted to be engaged by the steps on said members to control the extents of movement of said members, and a key coupler operated by said keys and constructed to operate said invariably movable means.

14. In a machine of the class described, the combination with a plurality of groups of manipulative devices, of a plurality of pairs of complementarily and differentially movable members, and means actuated by means of the manipulative devices for imparting complementary movements to the members to engage them with the manipulated manipulative devices.

15. In a machine of the class described, the combination with a plurality of groups of keys, of a plurality of pairs of complementarily and differentially movable members, and means actuated by operating the keys for imparting complementary movements to the members whereby to engage them with the operated keys.

16. In a machine of the class described, the combination with a totalizer wheel, of a pair of members differentially movable to complementary extents for actuating the totalizer elements, means movable to an invariable extent for operating said members, and keys for driving said means and limiting the extents of movement of said members.

17. In a machine of the class described, the combination with a totalizer element, of a pair of members movable in the same direction for actuating said element, means movable to an invariable extent for operating said members, and keys for driving said means and positively limiting the extents of movement of said members.

18. In a machine of the class described, the combination with a totalizer element, of a pair of members movable in the same direction and to complementary extents for actuating said element, means movable to an invariable extent for operating said members and keys operable to move said means and constructed to be engaged by the members whereby to limit the movements of the latter.

19. In a machine of the class described, the combination with totalizer elements, of a pair of complementarily movable members for each element, one of which members is constructed to actuate its totalizer element, a pinion having an invariable bodily movement and a differential rotary movement for operating each pair of members, a set of operating keys, and means whereby operations of the keys impart the invariable bodily movement to the pinions and control the differential rotary movement thereof.

20. In a machine of the class described, the combination with totalizer elements, of a pair of complementarily movable members for each element, one of which is constructed to actuate its element, a pinion having an invariable bodily movement and a differentially rotary movement for operating each pair of members, a set of operating keys, and means whereby operations of the keys impart the invariable bodily movement to the pinions and positively limit the differential rotary movements thereof.

In testimony whereof I affix my signature.

THOMAS CARROLL.